US012125992B1

(12) United States Patent
Yang et al.

(10) Patent No.: US 12,125,992 B1
(45) Date of Patent: Oct. 22, 2024

(54) 1.5V LITHIUM BATTERY AND MANUFACTURING METHOD THEREOF

(71) Applicant: Hamedata Technology Co., Limited, Guangdong (CN)

(72) Inventors: Changjun Yang, Guangdong (CN); Jian Zhao, Guangdong (CN); Pengfei Xiao, Guangdong (CN); Wei Zhou, Guangdong (CN); Guohao Xu, Guangdong (CN); Qiang Hou, Guangdong (CN); Hong Xiao, Guangdong (CN)

(73) Assignee: Hamedata Technology Co., Limited, Guangdong (CN)

( * ) Notice: Subject to any disclaimer, the term of this patent is extended or adjusted under 35 U.S.C. 154(b) by 0 days.

(21) Appl. No.: 18/775,030

(22) Filed: Jul. 17, 2024

Related U.S. Application Data

(63) Continuation of application No. PCT/CN2024/096652, filed on May 31, 2024.

(30) Foreign Application Priority Data

Apr. 7, 2024 (CN) .................... 202410405939.X

(51) Int. Cl.
*H01M 10/42* (2006.01)
*H01M 10/052* (2010.01)
(Continued)

(52) U.S. Cl.
CPC ..... *H01M 10/4257* (2013.01); *H01M 10/052* (2013.01); *H01M 10/0587* (2013.01); *H01M 50/107* (2021.01); *H01M 50/119* (2021.01); *H01M 50/184* (2021.01); *H01M 50/186* (2021.01); *H01M 50/533* (2021.01);
(Continued)

(58) Field of Classification Search
CPC ........... H01M 10/4257; H01M 10/052; H01M 10/0587; H01M 50/586; H01M 50/107; H01M 50/186; H01M 50/533; H01M 50/534; H01M 50/184; H01M 50/59; H01M 50/119; H01M 50/536
See application file for complete search history.

(56) References Cited

FOREIGN PATENT DOCUMENTS

CN 203787480 U 8/2014
CN 113659257 A * 11/2021
(Continued)

OTHER PUBLICATIONS

CN 215816073 English Translation (Year: 2014).*
(Continued)

*Primary Examiner* — Jimmy Vo
(74) *Attorney, Agent, or Firm* — Cooper Legal Group, LLC

(57) ABSTRACT

The present application relates to a 1.5V lithium battery. The lithium battery includes a circuit assembly, a plastic frame, a wound battery core assembly, a first metal housing, a second metal housing, a first insulating seal and an insulating sheath. The wound battery core assembly is arranged in the second metal housing, the first metal housing and the second metal housing dock with each other and fixed by circumferential welding, and the circuit assembly includes a PCB, a low-voltage positive cap, a high-voltage positive connecting piece and a negative elastic piece. In the present application, the circuit assembly can stably output a low voltage of 1.5V.

9 Claims, 13 Drawing Sheets

(51) Int. Cl.
    *H01M 10/0587*    (2010.01)
    *H01M 50/107*     (2021.01)
    *H01M 50/119*     (2021.01)
    *H01M 50/184*     (2021.01)
    *H01M 50/186*     (2021.01)
    *H01M 50/533*     (2021.01)
    *H01M 50/534*     (2021.01)
    *H01M 50/536*     (2021.01)
    *H01M 50/586*     (2021.01)
    *H01M 50/59*      (2021.01)

(52) U.S. Cl.
    CPC ....... *H01M 50/534* (2021.01); *H01M 50/536* (2021.01); *H01M 50/586* (2021.01); *H01M 50/59* (2021.01)

(56) References Cited

FOREIGN PATENT DOCUMENTS

| CN | 215816073 U | * | 2/2022 | ........ H01M 10/0431 |
| CN | 117673498 A | | 3/2024 | |

OTHER PUBLICATIONS

CN 113659257 English Translation (Year: 2022).*
First Office Action received in corresponding Chinese patent application No. 202410405939.X. dated May 15, 2024, 12 pages.

* cited by examiner

1.5V LITHIUM BATTERY AND MANUFACTURING METHOD THEREOF

CROSS-REFERENCE TO RELATED APPLICATION

The present application is a continuation of PCT application serial no. PCT/CN2024/096652, filed on May 31, 2024, which claims the priority benefits of China patent application No. 202410405939.X, filed on Apr. 7, 2024. The entireties of PCT application serial no. PCT/CN2024/096652 and China patent application No. 202410405939.X are hereby incorporated by reference herein and made a part of this specification.

FIELD OF THE INVENTION

The present application relates to the field of lithium battery technologies, and in particular, to a 1.5V lithium battery and a manufacturing method thereof.

BACKGROUND OF THE INVENTION

Chinese Patent Application No. CN203787480U entitled "Variable-Voltage Cylindrical Battery Apparatus" discloses a low-voltage lithium battery, which changes a high voltage (3.0-4.2V) of a lithium battery into a low voltage of 1.5V through a voltage drop circuit board to replace a common alkaline battery and nickel-metal hydride battery, and thus can be widely used in various devices, such as remote controllers, electric toys, electric toothbrushes, shavers, wireless microphones, doorbells, or the like, after manufactured according to sizes of an AA battery, an AAA battery, or the like. The lithium battery has the advantages of no memory effect, high energy density and long service life, and universality is greatly improved after a voltage drop. However, a structure provided by the application is unreasonable, stability of an electrical performance is not high, and the application is only a conceptual innovation and is difficult to industrialize.

Chinese Patent Application No. CN117673498A entitled "Low-Voltage Lithium Battery" discloses a low-voltage lithium battery which can be industrialized. In actual production, a rolling groove is first processed on a metal housing, a wound battery core assembly is fixed in the metal housing, and then, a positive tab is pulled out and welded to a bottom wall of an inner conductive cap, only by which, a plastic middle frame and a circuit assembly can be put into the metal housing. Due to the above limitations in processing process, especially a deep position of an upper end of the wound battery core assembly in the metal housing, a longer positive tab is required. However, after the lithium battery is assembled, the positive tab is limited in a narrow space, at an uncontrollable radial position, and thus it is possible for the positive tab to contact an inner wall of the metal housing, thereby causing a short circuit, and leading to a serious potential safety hazard. Therefore, there is still room for improvement.

SUMMARY

In order to solve the technical problems that a positive tab of an existing low-voltage lithium battery has a larger length and uncontrollable radial position, and thus has the risk of a short circuit between the positive tab and a metal housing, the present invention provides a 1.5V lithium battery and a manufacturing method thereof.

In an aspect, the present application provides a 1.5V lithium battery, including a circuit assembly, a plastic frame, a wound battery core assembly, a first metal housing, a second metal housing, a first insulating seal and an insulating sheath, wherein the circuit assembly and the plastic frame are arranged in the first metal housing, the plastic frame is configured to fix the circuit assembly, the wound battery core assembly is arranged in the second metal housing, the first metal housing and the second metal housing dock with each other and fixed by circumferential welding, the first insulating seal is arranged between the first metal housing and the second metal housing and configured to seal the second metal housing, a horizontal sealing portion further extends inwards from a bottom of the first insulating seal, and the horizontal sealing portion is attached to a lower surface of the first metal housing to cover the lower surface of the first metal housing; the insulating sheath covers the first metal housing and the second metal housing; a positioning hole is formed in a bottom wall of the first metal housing, a second insulating seal and a riveting piece are arranged at the positioning hole, and the riveting piece rivets the second insulating seal to the bottom wall of the first metal housing to seal the positioning hole; the circuit assembly includes a PCB, a low-voltage positive cap, a high-voltage positive connecting piece and a negative elastic piece, the low-voltage positive cap, the high-voltage positive connecting piece and the negative elastic piece are all welded on the PCB, the negative elastic piece is in elastic contact with the first metal housing, the high-voltage positive connecting piece is in elastic contact with an upper end of the riveting piece, a positive tab of the wound battery core assembly is welded to a lower end of the riveting piece, and a negative tab of the wound battery core assembly is welded to the second metal housing.

The PCB in the circuit assembly in the present application is also provided with necessary circuits, such as a voltage drop circuit, a voltage stabilizing circuit, a charging circuit, an over-discharge protection circuit, or the like. In the above technical solution, the high-voltage positive connecting piece is used as a high-voltage positive input end and electrically connected with the positive tab of the wound battery core assembly by the riveting piece, the low-voltage positive cap is used as a positive electrode of the battery, the second metal housing is used as a negative electrode of the battery, and a low voltage of 1.5V can be stably output.

In the present application, the first metal housing and the second metal housing are provided so that the circuit assembly and the plastic frame are arranged in the first metal housing, the wound battery core assembly is arranged in the second metal housing. An upper end of the wound battery core assembly is at a shallow position in the second metal housing, the length of the required positive tab is shortened, and although the radial position is uncontrollable, the positive tab is not long enough to contact an inner wall of the metal housing, and a short circuit is thus avoided. In addition, the horizontal sealing portion also inwardly extends from the bottom of the first insulating seal, and the horizontal sealing portion is attached to the lower surface of the first metal housing, such that a sealing performance between the first insulating seal and the first metal housing can be improved, the lower surface of the first metal housing can be covered, the positive tab is prevented from contacting the lower surface of the first metal housing, the short circuit can also be avoided, and therefore, the risk of the short circuit between the positive tab and the metal housing is completely addressed.

The first insulating seal and the first metal housing completely seal an upper end of the second metal housing, such that the wound battery core assembly is prevented from moving up and down, and an electrolyte is also prevented from leaking. The second insulating seal seals the positioning hole to prevent the electrolyte from entering the first metal housing, and can also allow the riveting piece to be insulated relative to the first metal housing, and the riveting piece outputs a high voltage of the wound battery core assembly to the circuit assembly as an intermediate conductor.

Optionally, a lower end of the first metal housing is provided with a contraction portion, and the first insulating seal is partially clamped between the contraction portion and the second metal housing.

Optionally, an outer annular surface of the first insulating seal is provided with one or more annular protrusions to increase a sealing performance between the first insulating seal and the second metal housing.

Optionally, the second insulating seal is injection molded at the positioning hole, the riveting piece includes a rivet and a metal piece, a rivet hole is formed in a center of the metal piece, and the rivet is riveted to the metal piece to tightly press the second insulating seal against the bottom wall of the first metal housing, so as to seal the positioning hole.

Optionally, the circuit assembly further includes a charging interface, the charging interface is welded on the PCB, and a first opening and a second opening are formed in corresponding positions of the first metal housing and the insulating sheath respectively.

Optionally, the plastic frame includes an upper frame and a lower frame, and the PCB is fixed between the upper frame and the lower frame.

Optionally, a spun edge is inwards provided at an upper end of the first metal housing and configured to tightly press the plastic frame, a positive and negative electrode isolating piece is further arranged above or below the spun edge, and part of an upper surface of the positive and negative electrode isolating piece is further wrapped by the insulating sheath.

Optionally, the low-voltage positive cap is patch welded on the PCB, and some electronic elements on the PCB are arranged in the low-voltage positive cap.

Optionally, the wound battery core assembly includes a wound battery core, an upper isolating piece and a lower isolating piece, the positive tab extends out of a central hole of the upper isolating piece, and an end portion of the positive tab is welded to a lower surface of the riveting piece; and the negative tab is wound from a side surface to a bottom surface of the wound battery core, and an end portion of the negative tab is welded to a bottom wall of the second metal housing.

In another aspect, the present application further provides a manufacturing method of the above-mentioned 1.5V lithium battery, including:

S1: riveting the riveting piece at the positioning hole of the bottom wall of the first metal housing to seal the positioning hole;

S2: fixing the circuit assembly on the plastic frame, then mounting the circuit assembly and the plastic frame into the first metal housing, making the high-voltage positive connecting piece in the circuit assembly elastically contact the riveting piece, and making the negative elastic piece in the circuit assembly elastically contact the first metal housing, so as to realize electrical connection;

S3: manufacturing the spun edge at the upper end of the first metal housing, and tightly pressing the plastic frame in the first metal housing;

S4: sleeving the first insulating seal on the first metal housing, mounting the wound battery core assembly into the second metal housing, and welding the positive tab of the wound battery core assembly on a bottom surface of the riveting piece;

S5: pressing the first insulating seal and the lower end of the first metal housing into the second metal housing, and performing circumferential welding on the first metal housing and the second metal housing; and S6: sleeving the insulating sheath the obtained assembly on the first metal housing and the second metal housing, and performing heating shrinkage to wrap the insulating sheath on the first metal housing and the second metal housing.

In summary, the present application has at least one of the following beneficial effects.

The PCB in the circuit assembly in the present application is also provided with necessary circuits, such as the voltage drop circuit, the voltage stabilizing circuit, the charging circuit, the over-discharge protection circuit, or the like, and the low voltage of 1.5V can be stably output.

1. In the present application, the first metal housing and the second metal housing are provided. The upper end of the wound battery core assembly is positioned at a shallow position in the second metal housing, the length of the required positive tab is shortened, and although the radial position is uncontrollable, the positive tab is not long enough to contact the inner wall of the metal housing, and the risk of the short circuit between the positive tab and the metal housing is completely addressed.

2. The first insulating seal can prevent the electrolyte from leaking out, and the second insulating seal can prevent the electrolyte from entering the first metal housing, thus guaranteeing stable electrical performance.

DETAILED DESCRIPTION

The present application is described in further detail below with reference to FIGS. 1 to 15.

First Embodiment

Figure 1:
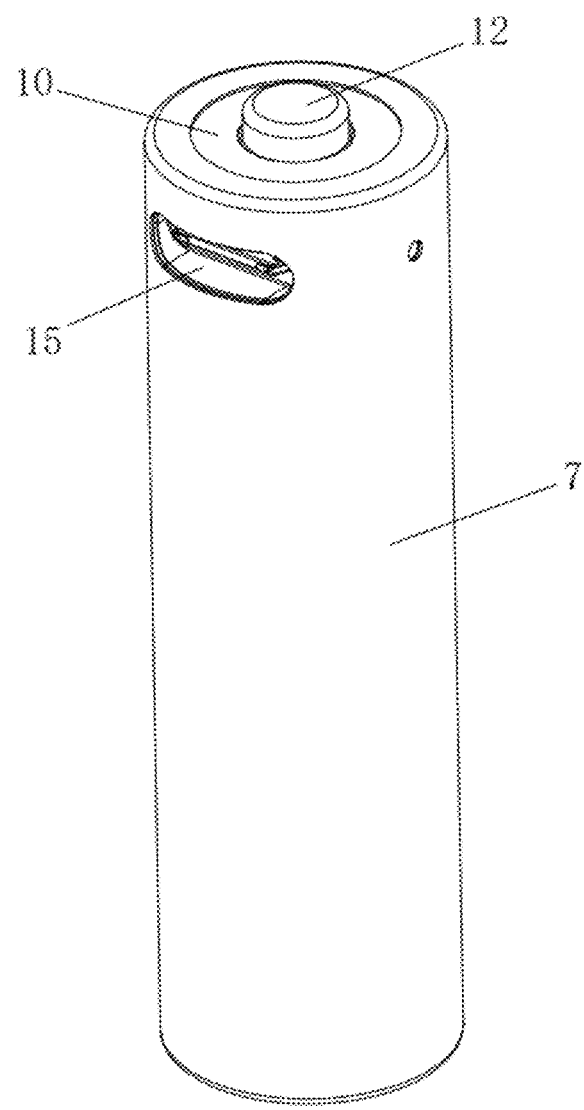
FIG. 1 is a perspective view of a 1.5V lithium battery according to a first embodiment of the present application.
Figure 2:
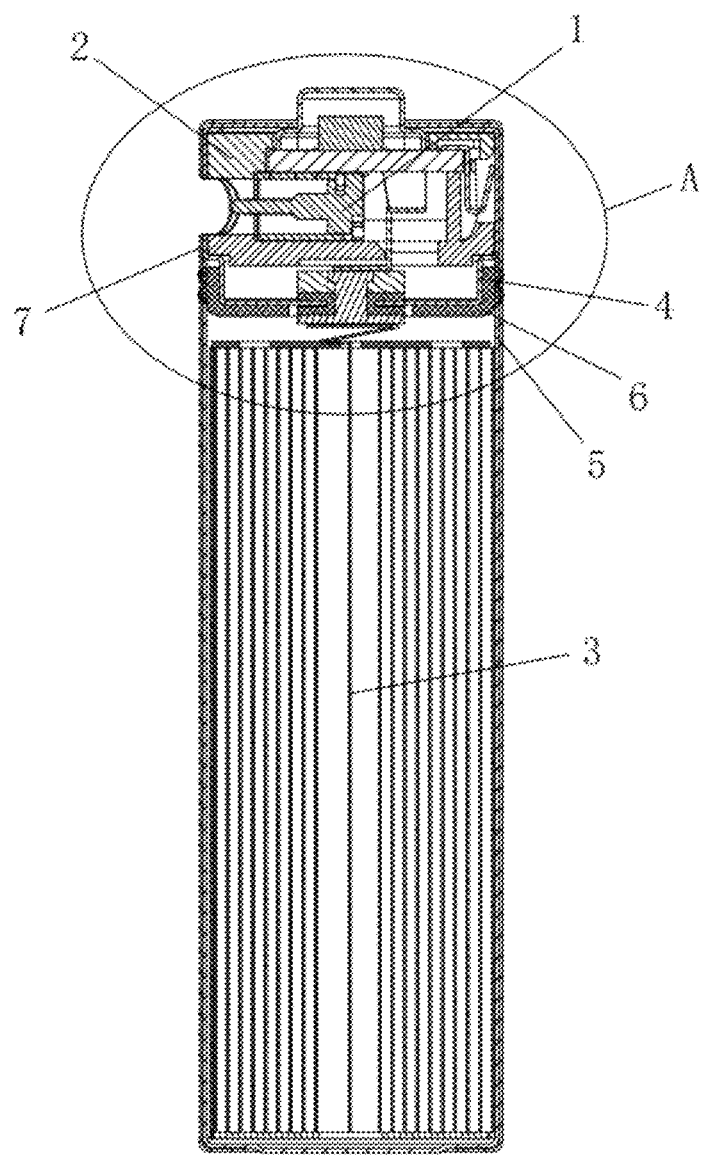
FIG. 2 is a schematic diagram of a half-section structure of the 1.5V lithium battery according to the first embodiment of the present application.
Figure 3:
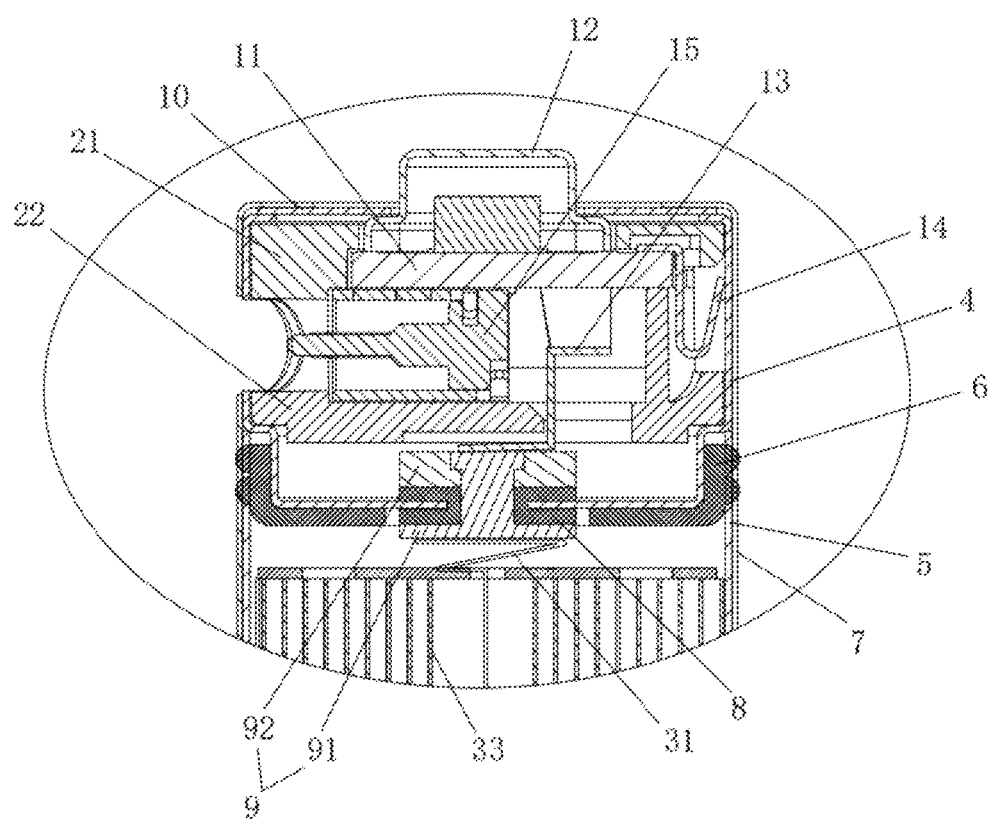
FIG. 3 is an enlarged view of Portion A in FIG. 2.

Referring to FIGS. 1 to 3, an embodiment of the present application discloses a 1.5V lithium battery, which is specifically an AA battery, and includes a circuit assembly 1, a plastic frame 2, a wound battery core assembly 3, a first metal housing 4, a second metal housing 5, a first insulating seal 6 and an insulating sheath 7. The circuit assembly 1 and the plastic frame 2 are arranged in the first metal housing 4, the plastic frame 2 is configured to fix the circuit assembly 1, and the wound battery core assembly 3 is arranged in the second metal housing 5. The first metal housing 4 and the second metal housing 5 dock with each other on top of one another, fixed by circumferential welding. The first insulating seal 6 is arranged between the first metal housing 4 and the second metal housing 5 and configured to seal the second metal housing 5. A horizontal sealing portion 61 also extends inwards from a bottom of the first insulating seal 6, and the horizontal sealing portion 61 is attached to a lower surface of the first metal housing 4 to cover the lower surface of the first metal housing 4. The insulating sheath 7 covers the first metal housing 4 and the second metal housing 5. A positioning hole 41 is formed in a bottom wall of the first metal housing 4, a second insulating seal 8 and a riveting piece 9 are arranged at the positioning hole 41, and the riveting piece 9 rivets the second insulating seal 8 to the bottom wall of the first metal housing 4 to seal the positioning hole 41.

The insulating sheath 7 is preferably made of PVC, and wraps the first metal housing 4 and the second metal housing 5 by thermal shrinkage.

Figure 4:
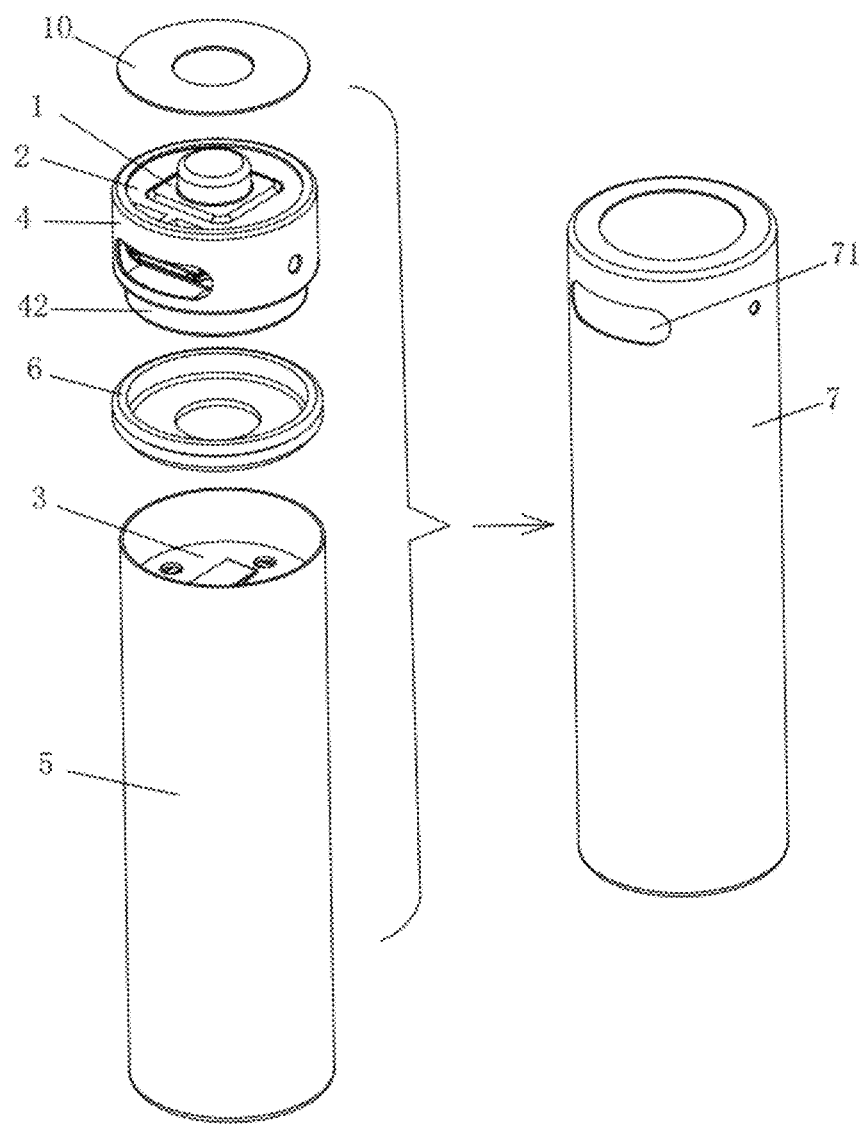
FIG. 4 is a schematic diagram of an overall assembling operation of a 1.5V lithium battery according to the first embodiment of the present application.

Referring to FIGS. 3 and 4, in the present embodiment, the first metal housing 4 and the second metal housing 5 have a same outer diameter, and thus the first insulating seal 6 cannot be arranged when the first metal housing 4 and the second metal housing 5 dock with each other. A contraction portion 42 is particularly provided at a lower end of the first metal housing 4, and the first insulating seal 6 is partially clamped between the contraction portion 42 and the second metal housing 5, which can better prevent leakage of an electrolyte. An outer annular surface of the first insulating seal 6 is provided with one or more annular protrusions 62 which can increase a sealing performance between the first insulating seal and the second metal housing 5.

Figure 5:
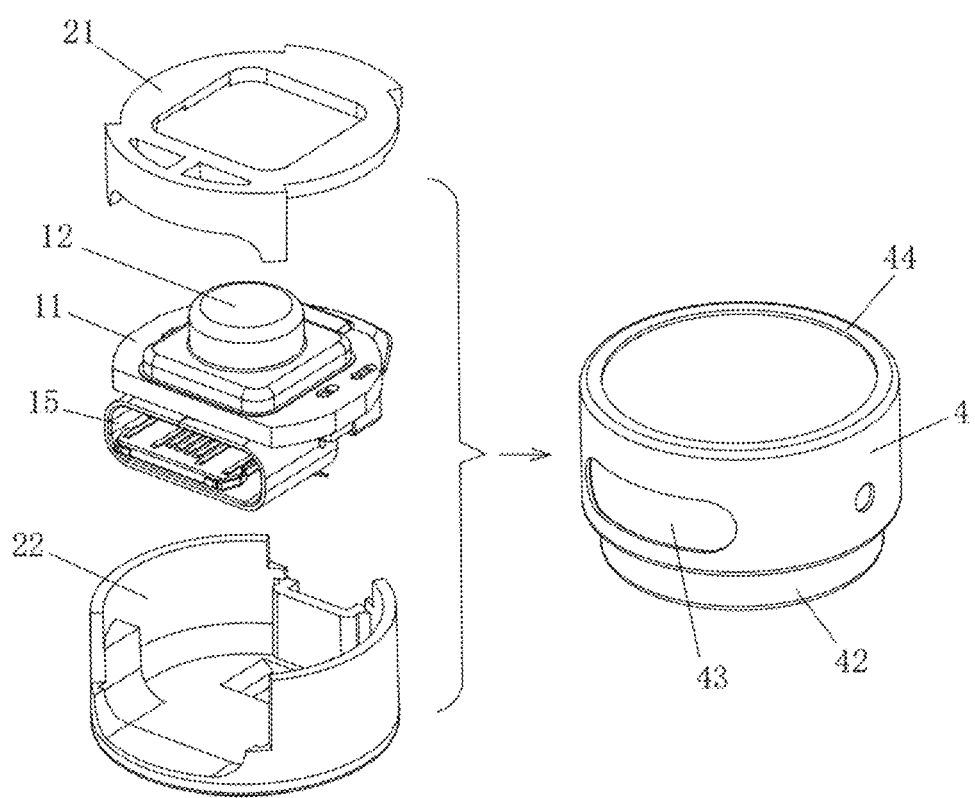
FIG. 5 is a schematic diagram of an assembling operation of mounting a circuit assembly and a plastic frame into a first metal housing in the first embodiment of the present application.

Referring to FIG. 5, the plastic frame 2 includes an upper frame 21 and a lower frame 22, the PCB 11 is fixed between the upper frame 21 and the lower frame 22, and the upper frame 21 and the lower frame 22 may be fixedly pasted by adhesive dispensing, may be fixed by a buckle, or may not be fixed.

Referring to FIG. 5, a spun edge 44 is inwards provided at an upper end of the first metal housing 4 and configured to tightly press the plastic frame 2, a positive and negative electrode isolating piece 10 is further pasted above the spun edge 44, and part of an upper surface of the positive and negative electrode isolating piece 10 is further wrapped by the insulating sheath 7, thus effectively preventing the positive and negative electrode isolating piece 10 from falling off.

Figure 6:
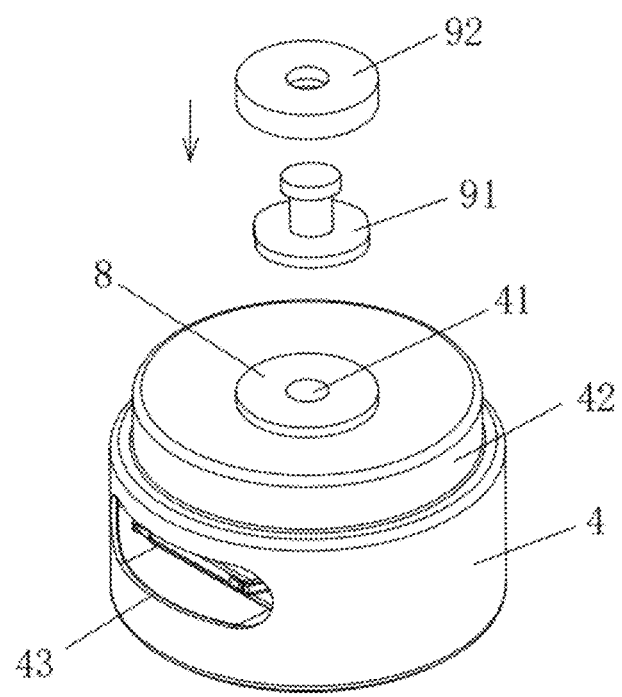
FIG. 6 is a schematic diagram of an assembling operation of riveting a second insulating seal on a second metal housing by a riveting piece in the first embodiment of the present application.

Referring to FIGS. 3 and 6, the second insulating seal 8 is formed at the positioning hole 41 in an injection molding mode. The riveting piece 9 includes a rivet 91 and a metal piece 92, a rivet hole is formed in a center of the metal piece 92, the rivet 91 is riveted to the metal piece 92 to tightly press the second insulating seal 8 and the bottom wall of the first metal housing 4, so as to seal the positioning hole 41, and the electrolyte cannot permeate into the first metal housing 4 from the positioning hole 41. The riveting piece 9 penetrates through the positioning hole 41 of the first metal housing 4, is insulated relative to the first metal housing 4, and electrically connects the high-voltage positive connecting piece 13 and the positive tab 31 by utilizing conductivity of the riveting piece, so as to provide high-voltage power input for the circuit assembly 1. Since a size of the second insulating seal 8 is quite small, manual assembly is quite difficult, time and labor are wasted, mounting tends to be not in place, and insulating and sealing effects are influenced. Therefore, in the present application, the second insulating seal 8 is formed at the positioning hole 41 in the injection molding mode, and a position, size and shape of the second insulating seal 8 are more precise, such that sealing and insulation performances are better ensured.

Figure 8:
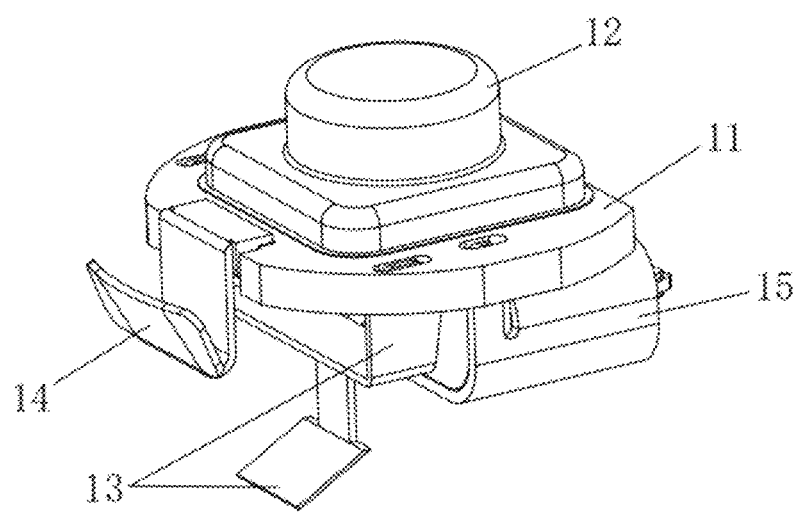
FIG. 8 is a schematic structural diagram of the circuit assembly in the first embodiment of the present application.
Figure 9:
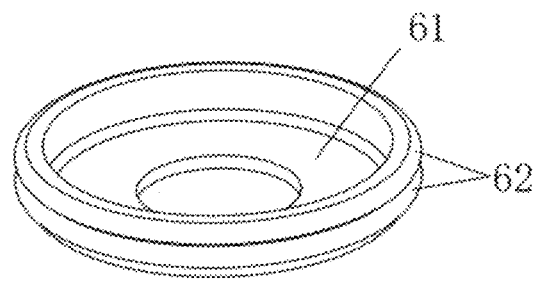
FIG. 9 is a schematic structural diagram of a first insulating seal in the first embodiment of the present application.
Figure 10:
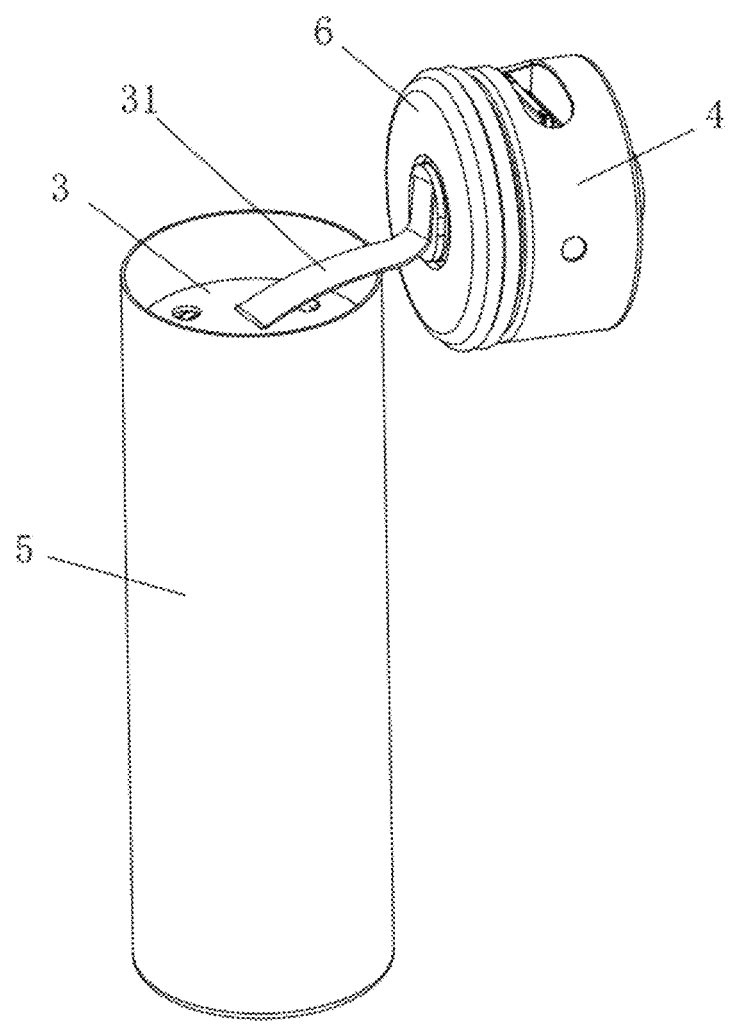
FIG. 10 is a schematic diagram of an operation of welding a positive tab onto the riveting piece in the first embodiment of the present application.
Figure 11:
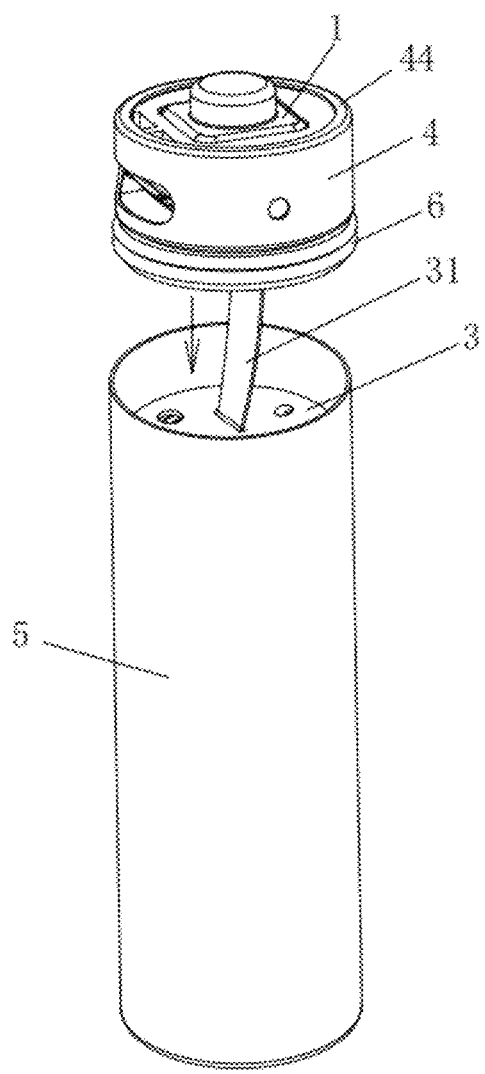
FIG. 11 is a schematic diagram of an operation of mounting the first metal housing and the first insulating seal into the second metal housing in the first embodiment of the present application.
Figure 12:
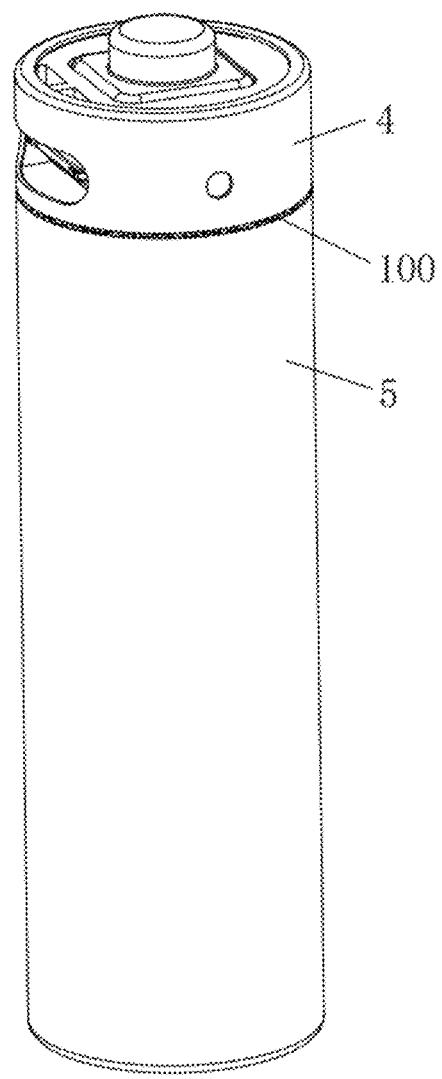
FIG. 12 is a schematic diagram of circumferential welding of the first metal housing and the second metal housing in the first embodiment of the present application.

Referring to FIGS. 5 and 8, the circuit assembly 1 includes a PCB 11, a low-voltage positive cap 12, a high-voltage positive connecting piece 13 and a negative elastic piece 14, and the low-voltage positive cap 12, the high-voltage positive connecting piece 13 and the negative elastic piece 14 are all welded on the PCB 11. The negative elastic piece 14 is in elastic contact with the first metal housing 4, the high-voltage positive connecting piece 13 is in elastic contact with an upper end of the riveting piece 9, a positive tab 31 of the wound battery core assembly 3 is welded to a lower end of the riveting piece 9, and a negative tab 32 of the wound battery core assembly is welded to the second metal housing 5. Referring to FIGS. 4 and 5, the circuit assembly 1 in the present embodiment further includes a charging interface 15 which is specifically a TYPE-C interface, and the charging interface 15 is welded on the PCB 11. A first opening 43 and a second opening 71 are formed in corresponding positions of the first metal housing 4 and the insulating sheath 7 respectively. The first metal housing 4 and the second metal housing 5 are used as common negative electrodes.

Referring to FIG. 5, the low-voltage positive cap 12 is welded on the PCB 11 by a patch, such that firstly, connection strength is good, and fixation is reliable; and secondly, a junction has a large sectional area and a small resistance, and a conductive performance is good. Some electronic elements on the PCB 11 are preferably and centrally arranged in the low-voltage positive cap 12. The electronic elements are arranged reasonably, and an inner space of the low-voltage positive cap 12 is fully used.

Figure 7:
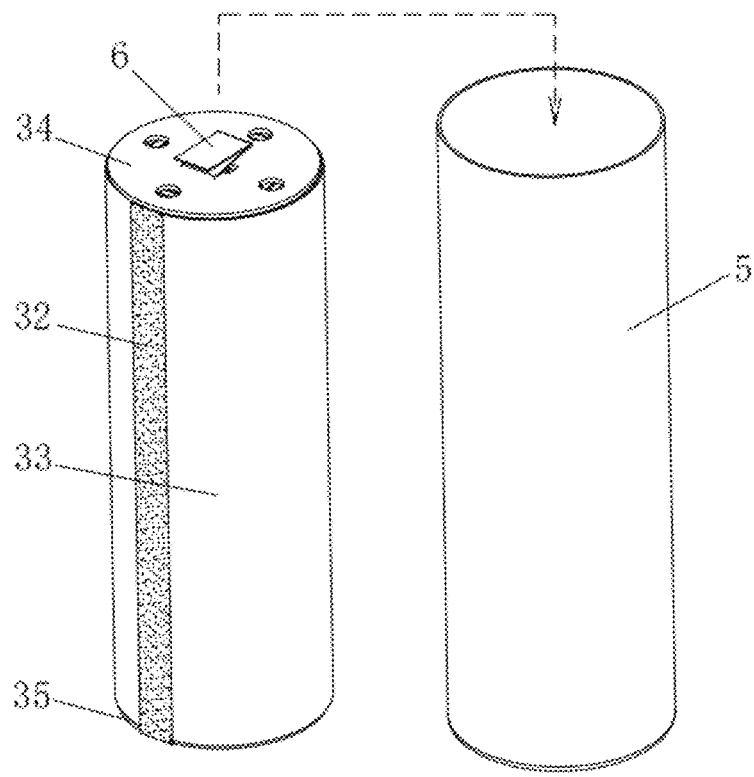
FIG. 7 is a schematic diagram of an assembling operation of mounting a wound battery core assembly on the second metal housing in the first embodiment of the present application.

Referring to FIG. 7, the wound battery core assembly 3 includes a wound battery core 33, an upper isolating piece 34 and a lower isolating piece 35, the positive tab 31 penetrates out of a central hole of the upper isolating piece 34, and an end portion of the positive tab is welded to a lower surface of the riveting piece 9; and the negative tab 32 is wound from a side surface to a bottom surface of the wound battery core 33, and an end portion of the negative tab is welded to a bottom wall of the second metal housing 5. In the present application, the wound battery core 33 is directly placed in the second metal housing 5, and compared with a soft-package lithium battery core or a hard-shell lithium battery core in the prior art, a wrapping housing is omitted, and a cost is lower.

In the present application, a circuit has the specific connection principle that the positive tab 31 of the wound battery core assembly 3 is connected to the PCB 11 through the riveting piece 9 and the high-voltage positive connecting piece 13, the negative tab 32 of the wound battery core assembly 3 is connected to the PCB 11 through the second metal housing 5, the first metal housing 4 and the negative elastic piece 14, and after a voltage drop by the circuit on the PCB 11, a positive voltage of 1.5V is output from the low-voltage positive cap 12, and the negative electrode of the lithium battery is output from the second metal housing 5.

A manufacturing method of the 1.5V lithium battery according to the present embodiment includes the following steps:

S1: riveting the riveting piece 9 at the positioning hole 41 of the bottom wall of the first metal housing 4 to seal the positioning hole 41;

S2: fixing the circuit assembly 1 on the plastic frame 2, then mounting the circuit assembly and the plastic frame into the first metal housing 4, making the high-voltage positive connecting piece 13 in the circuit assembly 1 elastically contact the riveting piece 9, and making the negative elastic piece 14 in the circuit assembly 1 elastically contact the first metal housing 4, so as to realize electrical connection;

S3: manufacturing the spun edge 44 at the upper end of the first metal housing 4, and tightly pressing the plastic frame 2 in the first metal housing 4;

S4: sleeving the first metal housing 4 with the first insulating seal 6, mounting the wound battery core assembly 3 into the second metal housing 5, and welding the positive tab 31 of the wound battery core assembly 3 on a bottom surface of the riveting piece 9;

S5: pressing the first insulating seal 6 and the lower end of the first metal housing 4 into the second metal housing 5, and performing circumferential welding 100 on the first metal housing 4 and the second metal housing 5; and S6: pasting the positive and negative electrode isolating piece 10 on the spun edge 44, sleeving the obtained assembly with the insulating sheath 7, and performing heating shrinkage to wrap the insulating sheath 7 on the first metal housing 4 and the second metal housing 5.

The manufacturing method according to the present application has a reasonable process and a high yield, and can realize industrialization and large-scale production.

The PCB 11 in the circuit assembly 1 in the present application is also provided with necessary circuits, such as a voltage drop circuit, a voltage stabilizing circuit, a charging circuit, an over-discharge protection circuit, or the like, the high-voltage positive connecting piece 13 is used as a high-voltage positive input end and electrically connected with the positive tab 31 of the wound battery core assembly 3 by the riveting piece 9, the low-voltage positive cap 12 is used as a positive electrode of the battery, the second metal housing 5 is used as a negative electrode of the battery, and a low voltage of 1.5V can be stably output.

In the present application, the first metal housing 4 and the second metal housing 5 are arranged, the circuit assembly 1 and the plastic frame 2 are arranged in the first metal housing 4, the wound battery core assembly 3 is arranged in the second metal housing 5, a position of an upper end of the wound battery core assembly 3 in the second metal housing 5 is shallow, the required positive tab 31 is shortened, and although the radial position is uncontrollable, the positive tab is not long enough to contact an inner wall of the metal housing, and a short circuit cannot be caused. In addition, the horizontal sealing portion 61 also inwards extends from the bottom of the first insulating seal 6, and the horizontal sealing portion 61 is attached to the lower surface of the first metal housing 4, such that a sealing performance between the first insulating seal 6 and the first metal housing 4 can be improved, the lower surface of the first metal housing 4 can be covered, the positive tab 31 is prevented from contacting the lower surface of the first metal housing 4, the short circuit can also be avoided, and therefore, the risk of the short circuit between the positive tab 31 and the metal housing is completely solved.

The first insulating seal 6 and the first metal housing 4 completely seal an upper end of the second metal housing 5, such that the wound battery core assembly 3 is prevented from moving up and down, and the electrolyte is also prevented from leaking; the second insulating seal 8 seals the positioning hole 41 to prevent the electrolyte from entering the first metal housing 4, and can also allow the riveting piece 9 to be insulated relative to the first metal housing 4, and the riveting piece 9 outputs a high voltage of the wound battery core assembly 3 to the circuit assembly as an intermediate conductor.

Second Embodiment

When the low-voltage lithium battery is an AAA battery, a width of the TYPE-C interface is large, a diameter of the AAA battery is small, the AAA battery cannot be horizontally placed, and therefore, the battery is vertically placed, the corresponding PCB 11 is vertically placed, and if the technical solution in the prior art is adopted, the position of the wound battery core assembly 3 in the metal housing is deeper, a longer positive tab 31 is required, and a short circuit is more prone to occurrence between the positive tab and the metal housing.

Figure 13:
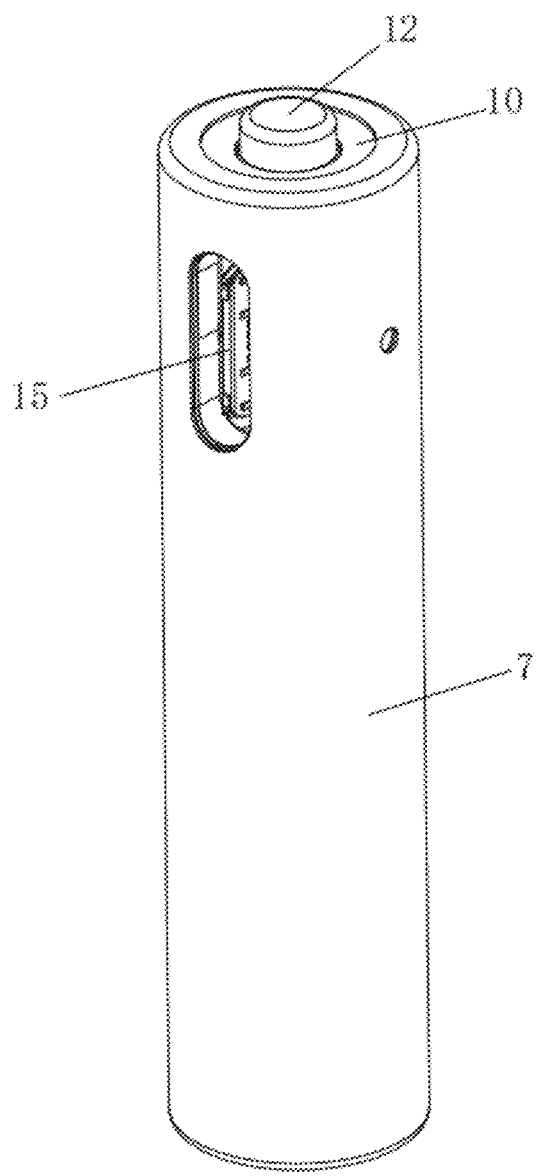
FIG. 13 is a perspective view of a 1.5V lithium battery according to a second embodiment of the present application.
Figure 14:
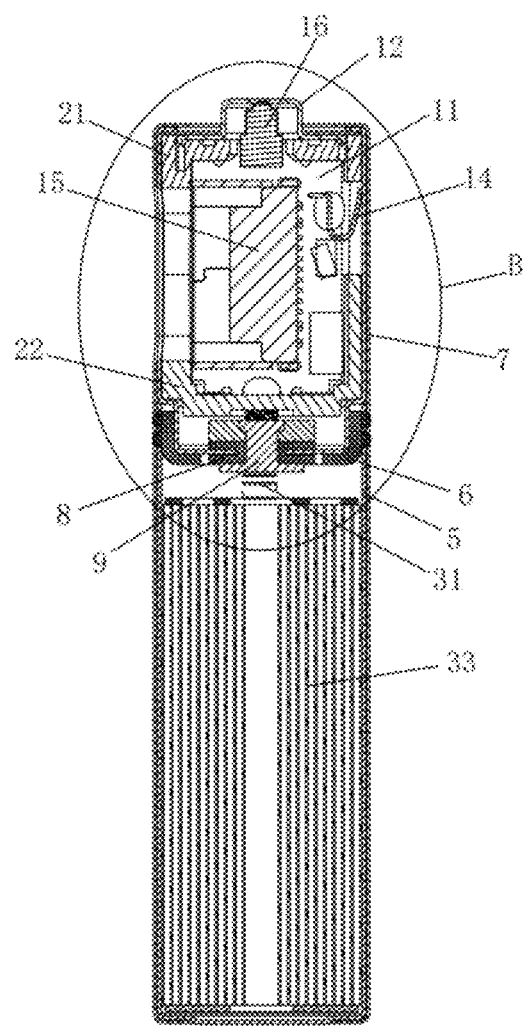
FIG. 14 is a schematic diagram of a half-section structure of the 1.5V lithium battery according to the second embodiment of the present application.
Figure 15:
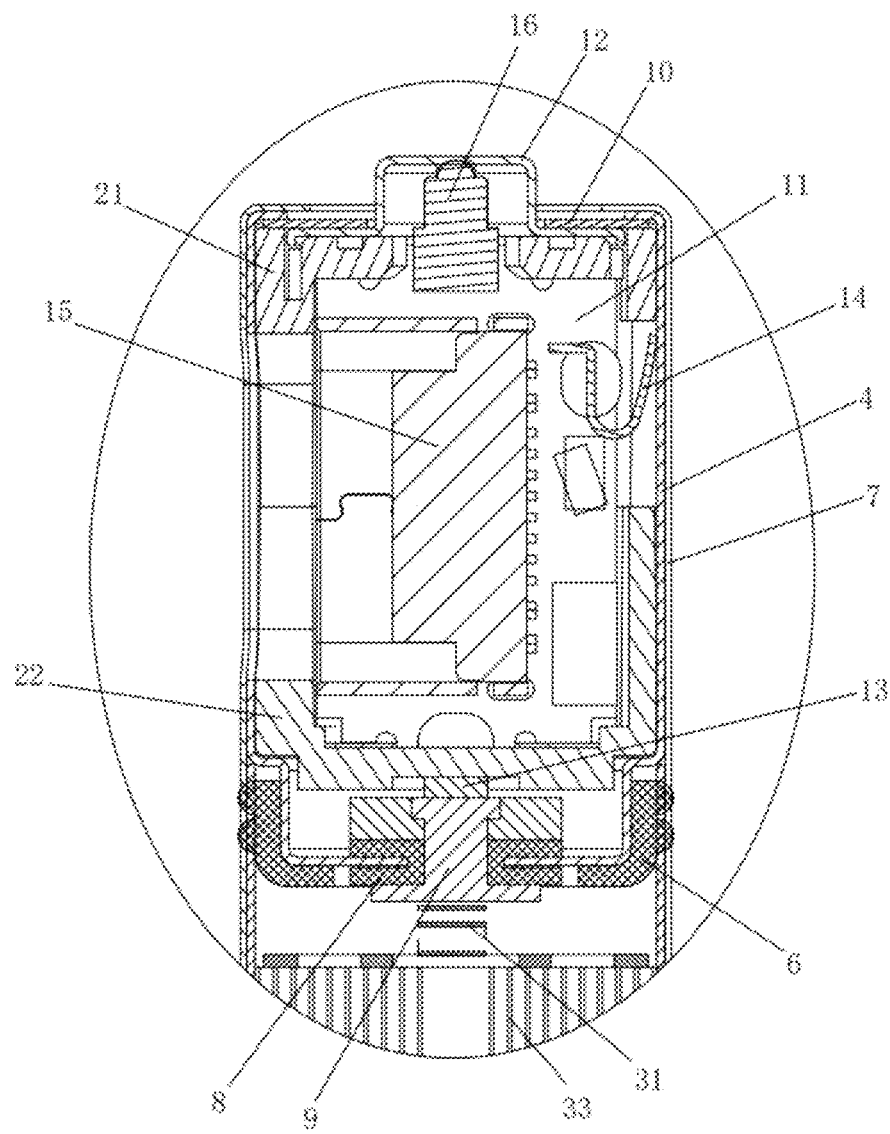
FIG. 15 is an enlarged view of Portion B in FIG. 14.

Referring to FIGS. 13 to 15, the present embodiment is different from the first embodiment in that the low-voltage lithium battery is an AAA battery, the TYPE-C interface and the PCB 11 are both vertically placed, and the low-voltage positive cap 12 is placed on the plastic frame 2 and is not directly welded to the PCB 11, such that an elastic conductor 16 is arranged on the PCB 11, and the elastic conductor 16 contacts the inner wall of the low-voltage positive cap 12 to realize positive output of a low voltage of 1.5V. The elastic conductor 16 may be an elastic piece or a spring.

In the present embodiment, the positive and negative electrode isolating piece 10 is provided below the spun edge 44 to effectively prevent the positive and negative electrode isolating piece 10 from falling off. In the manufacturing method, in step S2, the positive and negative electrode isolating piece 10 is required to be first placed in the first metal housing 4, and then, the spun edge 44 is made. Other structures and beneficial effects are consistent with the first embodiment, and the technical solution of the present application has a more remarkable effect in the present embodiment.

The above embodiments are preferred embodiments of the present application, and the protection scope of the present application is not limited thereby, and therefore, equivalent changes made according to the structure, shape and principle of the present application shall be covered by the protection scope of the present application.

LISTING OF REFERENCE SIGNS

1. Circuit Assembly
11. Pcb
12. Low-Voltage Positive Cap
13. High-Voltage Positive Connecting Piece
14. Negative Elastic Piece
15. Charging Interface
16. Elastic Conductor
2. Plastic Frame
21. Upper Frame
22. Lower Frame
3. Wound Battery Core Assembly
31. Positive Tab
32. Negative Tab
33. Wound Battery Core
34. Upper Isolating Piece
35. Lower Isolating Piece
4. First Metal Housing
41. Positioning Holes
42. Contraction Portion
43. First Opening
44. Spun Edge
5. Second Metal Housing
6. First Insulating Seal
61. Horizontal Sealing Portion
62. Annular Protrusion
7. Insulating Sheath
71. Second Opening
8. Second Insulating Seal
9. Riveting Piece
91. Rivet
92. Metal Piece
10. Positive And Negative Electrode Isolating Piece
100. Circumferential Welding

What is claimed is:

1. A 1.5V lithium battery, comprising a circuit assembly, a plastic frame, a wound battery core assembly, a first metal housing, a second metal housing, a first insulating seal and an insulating sheath, wherein the circuit assembly and the plastic frame are arranged in the first metal housing, the plastic frame is configured to fix the circuit assembly, the wound battery core assembly is arranged in the second metal housing, the first metal housing and the second metal housing dock with each other and are fixed by circumferential welding, the first insulating seal is arranged between the first metal housing and the second metal housing and configured to seal the second metal housing, a horizontal sealing portion further extends inwards from a bottom of the first insulating seal, the horizontal sealing portion is attached to a lower surface of the first metal housing to cover the lower surface of the first metal housing, and the insulating sheath covers the first metal housing and the second metal housing;

a positioning hole is defined in a bottom wall of the first metal housing, a second insulating seal and a riveting piece are provided at the positioning hole, and the riveting piece rivets the second insulating seal to the bottom wall of the first metal housing to seal the positioning hole;

the circuit assembly comprises a printed circuit board (PCB), a low-voltage positive cap, a high-voltage positive connecting piece and a negative elastic piece, the low-voltage positive cap, the high-voltage positive connecting piece and the negative elastic piece are all welded on the PCB, the negative elastic piece is in elastic contact with the first metal housing, the high-voltage positive connecting piece is in elastic contact with an upper end of the riveting piece, a positive tab of the wound battery core assembly is welded to a lower end of the riveting piece, and a negative tab of the wound battery core assembly is welded to the second metal housing.

2. The 1.5V lithium battery according to claim 1, wherein a lower end of the first metal housing is provided with a contraction portion, and the first insulating seal is partially clamped between the contraction portion and the second metal housing.

3. The 1.5V lithium battery according to claim 2, wherein an outer annular surface of the first insulating seal is provided with one or more annular protrusions to increase sealing performance between the first insulating seal and the second metal housing.

4. The 1.5V lithium battery according to claim 1, wherein the second insulating seal is injection molded at the positioning hole, the riveting piece comprises a rivet and a metal piece, a rivet hole is formed in a center of the metal piece, and the rivet is riveted to the metal piece to press the second insulating seal against the bottom wall of the first metal housing, so as to seal the positioning hole.

5. The 1.5V lithium battery according to claim 1, wherein the circuit assembly further comprises a charging interface, the charging interface is welded on the PCB, and a first opening and a second opening are formed in corresponding positions of the first metal housing and the insulating sheath, respectively.

6. The 1.5V lithium battery according to claim 1, wherein the plastic frame comprises an upper frame and a lower frame, and the PCB is fixed between the upper frame and the lower frame.

7. The 1.5V lithium battery according to claim 1, wherein a spun edge is inwardly provided at an upper end of the first metal housing and configured to press the plastic frame, a positive and negative electrode isolating piece is further arranged above or below the spun edge, and part of an upper surface of the positive and negative electrode isolating piece is further wrapped by the insulating sheath.

8. The 1.5V lithium battery according to claim 1, wherein the low-voltage positive cap is patch welded on the PCB, and some electronic elements on the PCB are arranged in the low-voltage positive cap.

9. The 1.5V lithium battery according to claim 1, wherein the wound battery core assembly comprises a wound battery core, an upper isolating piece and a lower isolating piece, the positive tab extends out of a central hole of the upper isolating piece, an end portion of the positive tab is welded to a lower surface of the riveting piece, the negative tab is wound from a side surface to a bottom surface of the wound battery core, and an end portion of the negative tab is welded to a bottom wall of the second metal housing.

* * * * *